(12) United States Patent
Watabe (10) Patent No.: US 7,315,240 B2
(45) Date of Patent: Jan. 1, 2008

(54) TIRE INFLATION PRESSURE SENSING APPARATUS WITH COMMAND SIGNAL RECEIVER HAVING VARIABLE RECEIVER SENSITIVITY

(75) Inventor: Nobuya Watabe, Nagoya (JP)

(73) Assignee: DENSO CORPORATION, Kariya (JP)

( * ) Notice: Subject to any disclaimer, the term of this patent is extended or adjusted under 35 U.S.C. 154(b) by 197 days.

(21) Appl. No.: 11/313,949

(22) Filed: Dec. 22, 2005

(65) Prior Publication Data

US 2006/0145829 A1 Jul. 6, 2006

(30) Foreign Application Priority Data

Dec. 22, 2004 (JP) ............................. 2004-370625

(51) Int. Cl.
*B60C 23/00* (2006.01)
*G08C 19/00* (2006.01)

(52) U.S. Cl. ...................... 340/447; 340/444; 73/146.5
(58) Field of Classification Search ................. 340/447
See application file for complete search history.

(56) References Cited

U.S. PATENT DOCUMENTS

| 5,880,363 A | 3/1999 | Meyer et al. |
| 7,032,441 B2 * | 4/2006 | Kanatani et al. ............... 73/146 |
| 2003/0179082 A1 | 9/2003 | Ide |

FOREIGN PATENT DOCUMENTS

| DE | 196 32 150 A1 | 2/1998 |
| EP | 1197356 A2 | 4/2002 |
| EP | 1 205 317 A2 | 5/2002 |
| JP | 2004-145623 | 5/2004 |

OTHER PUBLICATIONS

Search Report from European Patent Office issued on Jan. 18, 2007 for the corresponding European patent application No. 05027920.7-2425 (a copy thereof).

* cited by examiner

*Primary Examiner*—Donnie L. Crosland
(74) *Attorney, Agent, or Firm*—Posz Law Group, PLC (57) ABSTRACT

A tire inflation pressure sensing apparatus according to the present invention includes a transmitter, a receiver, and a command signal receiver. The transmitter is provided on a wheel of a vehicle and includes a pressure sensor configured to sense the inflation pressure of a tire on the wheel and generate a pressure signal indicative of the sensed inflation pressure. The receiver is provided on the body of the vehicle and works to receive the pressure signal and determine the inflation pressure of the tire based on the pressure signal. The command signal receiver is operatively connected to the transmitter and works to receive command signals that indicate instructions for the transmitter. The command signal receiver has a variable receiver sensitivity so as to prevent the command signal receiver and transmitter from being activated by noises while ensuring reliable activation of the command signal receiver and transmitter by "true" command signals.

20 Claims, 6 Drawing Sheets

TIRE INFLATION PRESSURE SENSING APPARATUS WITH COMMAND SIGNAL RECEIVER HAVING VARIABLE RECEIVER SENSITIVITY

CROSS-REFERENCE TO RELATED APPLICATION

This application claims priority from Japanese Patent Application No. 2004-370625, filed on Dec. 22, 2004, the content of which is hereby incorporated by reference into this application.

BACKGROUND OF THE INVENTION

1. Technical Field of the Invention

The present invention relates generally to tire condition monitoring systems for vehicles. More particularly, the invention relates to a direct-type tire inflation pressure sensing apparatus for a vehicle which includes command signal receivers that have a variable receiver sensitivity.

2. Description of the Related Art

Conventional direct-type tire inflation pressure sensing apparatuses for vehicles are generally configured with at least one transmitter and a receiver.

The transmitter is directly installed to a wheel of the vehicle and includes a pressure sensor working to sense the inflation pressure of a tire mounted on the wheel. The transmitter is configured to transmit a pressure signal that indicates the inflation pressure of the tire sensed by the pressure sensor.

The receiver is installed to the body of the vehicle and includes an antenna. The receiver is configured to receive the pressure signal transmitted from the transmitter via the antenna and determine the inflation pressure of the tire based on the pressure signal.

In such direct-type tire inflation pressure sensing apparatuses, the transmitter may be configured to further include a command signal receiver or a command signal receiving circuit (For example, as disclosed in European Patent No. 1197356).

The command signal receiver is usually in a sleep mode. However, when an electromagnetic wave is transmitted to the command signal receiver, it "wakes up" to receive the electromagnetic wave. Then, the transmitter determines whether the electromagnetic wave is a command signal that indicates a predefined instruction for the transmitter or merely a noise from the external environment. If the electromagnetic wave is a command signal, the transmitter performs a predetermined task (e.g. transmitting the pressure signal) according to the instruction indicated by the command signal, and then the command signal receiver returns to the sleep mode. Otherwise, if the electromagnetic wave is merely a noise, the command signal receiver immediately returns to the sleep mode so as to suppress the electric power consumption (i.e., the standby current) thereof.

However, with such a configuration, when the vehicle is parked in an area where there exist electromagnetic wave noises with high levels, those noises will be applied to the command signal receiver of the transmitter. Consequently, the command signal receiver will repeat "waking up" and "going to sleep" for a long time, thus increasing the electric power consumption of the transmitter. Accordingly, in the case of the transmitter being supplied with electric power by a battery, the service life of the battery will be reduced.

As a solution for the above problem, one may consider lowering the receiver sensitivity of the command signal receiver so as to prevent the command signal receiver from being activated by "fake" command signals (i.e., noises). However, this will, at the same time, increase the necessary level (or strength) of "true" command signals for activating the command signal receiver. Consequently, in some cases, an intended transmission of a command signal to the command signal receiver could not cause the transmitter to perform a necessary task.

SUMMARY OF THE INVENTION

The present invention has been made in view of the above mentioned problem.

It is, therefore, a primary object of the present invention to provide a direct-type tire inflation pressure sensing apparatus for a vehicle which includes command signal receivers having a variable receiver sensitivity so as to prevent the command signal receivers from being activated by fake command signals (i.e., noises) while ensuring reliable activation of the command signal receivers by true command signals.

According to one aspect of the present invention, a tire inflation pressure sensing apparatus S1 is provided which includes a transmitter, a receiver, and a command signal receiver.

The transmitter is provided on a wheel of a vehicle. The transmitter includes a pressure sensor configured to sense the inflation pressure of a tire mounted on the wheel and generate a pressure signal that indicates the sensed inflation pressure of the tire. The transmitter has a first operation mode, in which the transmitter transmits the pressure signal generated by the pressure sensor, and a second operation mode.

The receiver is provided on the body of the vehicle. The receiver works to receive the pressure signal transmitted from the transmitter and determine the inflation pressure of the tire based on the pressure signal.

The command signal receiver is operatively connected to the transmitter. The command signal receiver works to sequentially receive a first and a second command signal that respectively indicate a first and a second instruction for the transmitter. The command signal receiver has a variable receiver sensitivity that is set by the transmitter to one of a higher value and a lower value.

Further, in the tire inflation pressure sensing apparatus S1, in response to receipt of the first command signal by the command signal receiver, the transmitter enters into the second operation mode and sets the receiver sensitivity of the command signal receiver to the higher value according to the first instruction indicated by the first command signal.

After setting of the receiver sensitively of the command signal receiver to the higher value, the command signal receiver receives the second command signal so that the transmitter performs a predetermined task according to the second instruction indicated by the second command signal.

With such a configuration, when the tire inflation pressure sensing apparatus S1 is in service, the transmitter operates in the first operation mode to transmit the pressure signal and the receiver sensitivity of the command signal receiver is set to the lower value.

Consequently, even when the vehicle is parked in an area where there exist electromagnetic wave noises with high levels, the command signal receiver and the transmitter can still be prevented from being activated by those noises, thus suppressing the electric power consumption of the command signal receiver and the transmitter.

Moreover, when a routine work is to be performed for the tire inflation pressure sensing apparatus S1 in a factory or a dealer's shop, the first command signal is applied to the command signal receiver so that the transmitter enters into the second operation mode and sets the receiver sensitivity of the command signal receiver to the higher value according to the first instruction indicated by the first command signal.

Consequently, succeeding command signals, including the second command signal, can be reliably applied by a command signal applying device to the command signal receiver from a location that is sufficiently away from the command signal receiver, thus improving efficiency of the routine work.

As a result, it becomes possible to prevent the command signal receiver and transmitter of the tire inflation pressure sensing apparatus S1 from being activated by noises while ensuring easy and reliable activation of the command signal receiver and transmitter by true command signals.

According to another aspect of the present invention, a tire inflation pressure sensing apparatus S2 is provided which includes a transmitter, a receiver, and a command signal receiver.

The transmitter is provided on a wheel of a vehicle. The transmitter includes a pressure sensor configured to sense the inflation pressure of a tire mounted on the wheel and generate a pressure signal that indicates the sensed inflation pressure of the tire. The transmitter has a first operation mode, in which the transmitter transmits the pressure signal generated by the pressure sensor, and a second operation mode.

The receiver is provided on the body of the vehicle. The receiver works to receive the pressure signal transmitted from the transmitter and determine the inflation pressure of the tire based on the pressure signal.

The command signal receiver is operatively connected to the transmitter. The command signal receiver works to receive a command signal that indicates an instruction for the transmitter. The command signal receiver has a variable receiver sensitivity.

Further, in the tire inflation pressure sensing apparatus S2, the receiver sensitivity of the command signal receiver is set to one of a higher value and a lower value by the transmitter based on the inflation pressure of the tire sensed by the pressure sensor.

More specifically, the transmitter sets the receiver sensitivity of the command signal receiver to the lower value when the inflation pressure of the tire is lower than a first reference value and higher than a second reference value and to the higher value otherwise.

Furthermore, in the tire inflation pressure sensing apparatus S2, the command signal is received by the command signal receiver when the receiver sensitivity of the command signal receiver has the higher value.

In response to receipt of the command signal by the command signal receiver, the transmitter enters into the second operation mode to perform a predetermined task according to the instruction indicated by the command signal.

With such a configuration, when the tire inflation pressure sensing apparatus S2 is in service, the transmitter operates in the first operation mode to transmit the pressure signal and the receiver sensitivity of the command signal receiver is set to the lower value due to the inflation pressure of the tire being lower than the first reference value and higher than the second reference value.

Consequently, even when the vehicle is parked in an area where there exist electromagnetic wave noises with high levels, the command signal receiver and the transmitter can still be prevented from being activated by those noises, thus suppressing the electric power consumption of the command signal receiver and the transmitter.

Moreover, when a routine work is to be performed for the tire inflation pressure sensing apparatus S2 in a factory or a dealer's shop, the receiver sensitivity of the command signal receiver is set to the higher value due to the inflation pressure of the tire being not lower than the first reference value or not higher than the second reference value.

Consequently, the command signal can be reliably applied by a command signal applying device to the command signal receiver from a location that is sufficiently away from the command signal receiver, thus improving efficiency of the routine work.

As a result, it becomes possible to prevent the command signal receiver and transmitter of the tire inflation pressure sensing apparatus S2 from being activated by noises while ensuring easy and reliable activation of the command signal receiver and transmitter by true command signals.

According to yet another aspect of the present invention, a tire inflation pressure sensing apparatus S4 is provided which includes a transmitter, a receiver, a speed sensor, and a command signal receiver.

The transmitter is provided on a wheel of a vehicle. The transmitter includes a pressure sensor configured to sense the inflation pressure of a tire mounted on the wheel and generate a pressure signal that indicates the sensed inflation pressure of the tire. The transmitter has a first operation mode, in which the transmitter transmits the pressure signal generated by the pressure sensor, and a second operation mode.

The receiver is provided on the body of the vehicle. The receiver works to receive the pressure signal transmitted from the transmitter and determine the inflation pressure of the tire based on the pressure signal.

The speed sensor is operatively connected to the transmitter and works to sense a speed of the vehicle.

The command signal receiver is operatively connected to the transmitter. The command signal receiver works to receive a command signal that indicates an instruction for the transmitter. The command signal receiver has a variable receiver sensitivity.

Further, in the tire inflation pressure sensing apparatus S4, the receiver sensitivity of the command signal receiver is set to one of a higher value and a lower value by the transmitter based on the speed of the vehicle sensed by the speed sensor.

More specifically, the transmitter sets the receiver sensitivity of the command signal receiver to the lower value when the speed of the vehicle is lower than a predetermined value and to the higher value otherwise.

Furthermore, in the tire inflation pressure sensing apparatus S4, the command signal is received by the command signal receiver when the receiver sensitivity of the command signal receiver has the higher value.

In response to receipt of the command signal by the command signal receiver, the transmitter enters into the second operation mode to perform a predetermined task according to the instruction indicated by the command signal.

With such a configuration, even when the vehicle is parked in an area where there exist electromagnetic wave noises with high levels, the command signal receiver and the transmitter can still be prevented from being activated by those noises. This is because the receiver sensitivity of the command signal receiver is set to the lower value then due to the speed of the vehicle being lower than the predetermined value.

Moreover, when the vehicle is running with the speed being not lower than the predetermined value and the receiver has not received the pressure signal transmitted from the transmitter for a predetermined time period, the receiver can reliably cause the transmitter to transmit the pressure signal once more through transmitting the command signal to the transmitter. This is because the receiver sensitivity of the command signal receiver is set to the higher value then due to the speed of the vehicle being not lower than the predetermined value.

As a result, it becomes possible to prevent the command signal receiver and transmitter of the tire inflation pressure sensing apparatus S4 from being activated by noises while ensuring reliable activation of the command signal receiver and transmitter by true command signals transmitted from the receiver.

BRIEF DESCRIPTION OF THE DRAWINGS

The present invention will be understood more fully from the detailed description given hereinafter and from the accompanying drawings of the preferred embodiments of the invention, which, however, should not be taken to limit the invention to the specific embodiments but are for the purpose of explanation and understanding only.

In the accompanying drawings.

DESCRIPTION OF THE PREFERRED EMBODIMENTS

The preferred embodiments of the present invention will be described hereinafter with reference to FIGS. 1-8.

It should be noted that, for the sake of clarity and understanding, identical components having identical functions in different embodiments of the invention have been marked, where possible, with the same reference numerals in each of the figures.

First Embodiment

Figure 1:
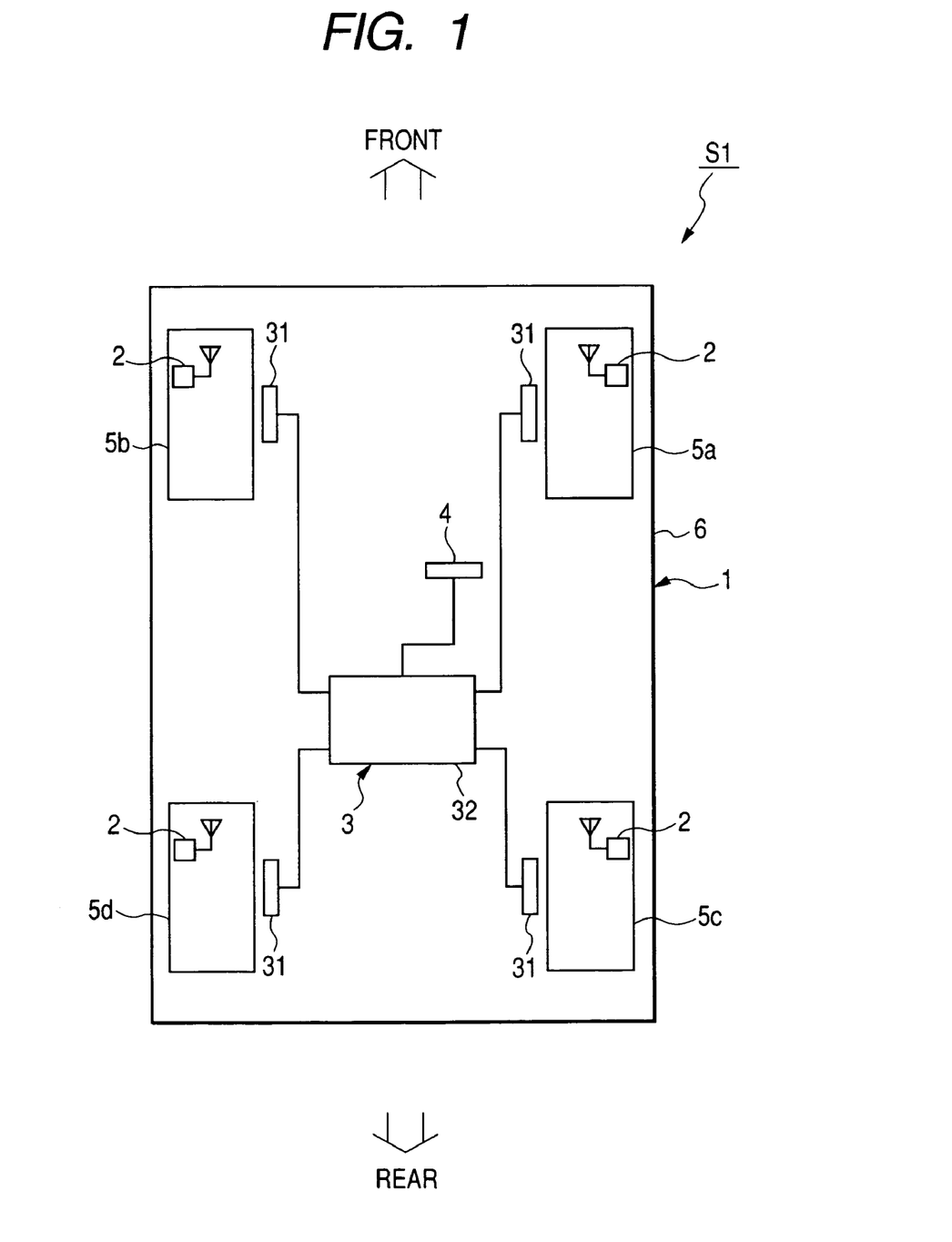
FIG. 1 is a schematic view illustrating the overall configuration of a tire inflation pressure sensing apparatus according to the first embodiment of the present invention.

FIG. 1 shows the overall configuration of a direct-type tire inflation pressure sensing apparatus S1 according to the first embodiment of the invention. In the figure, the tire inflation pressure sensing apparatus S1 is installed to a vehicle 1 so as to sense inflation pressures of four tires that are respectively mounted on four running wheels 5a-5d of the vehicle 1 (i.e., the front-right wheel 5a, the front-left wheel 5b, the rear-right wheel 5c, and the rear-left wheel 5d).

It is to be appreciated that the vehicle 1 may have a different number of tires. For example, the vehicle 1 may include a fifth tire (not shown) that is stored as a spare tire.

As shown in FIG. 1, the tire inflation pressure sensing apparatus S1 is configured with four transmitters 2, each of which is installed to one of the four wheels 5a-5d, a receiver 3 that is installed to the body 6 of the vehicle 1, and a warning device 4 that is electrically connected to the receiver 3.

Each of the transmitters 2 works to sense the inflation pressure of a corresponding one of the four tires and transmit a frame that contains a pressure signal indicative of the sensed inflation pressure of the tire.

Figure 2A:
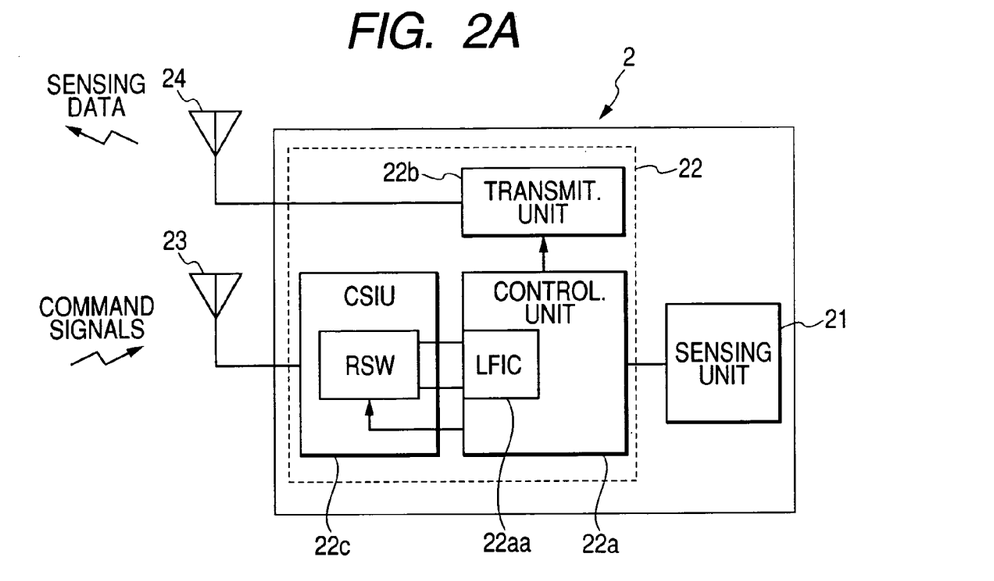
FIG. 2A is a block diagram showing the overall configuration of a transmitter of the tire inflation pressure sensing apparatus of FIG. 1.

FIG. 2A shows the overall configuration of each of the transmitters 2. As shown in the figure, each of the transmitters 2 includes a sensing unit 21, a microcomputer 22, a receiving antenna 23, and a transmitting antenna 24.

The sensing unit 21 is configured with sensors, such as a diaphragm-type pressure sensor and a temperature sensor, and works to output signals that indicate the sensed inflation pressure of the tire and the temperature of air in the tire.

The microcomputer 22 is of a well-known type, which is configured with a CPU (Central Processing Unit), a ROM (READ Only Memory), a RAM (Random Access Memory), and I/O (Input/Output) devices.

The microcomputer 22 functionally includes a controlling unit 22a, a transmitting unit 22b, and a command signal inputting unit 22c (i.e., CSIU in FIG. 2A), which are realized by a program installed in the ROM when the program is activated. Those units 22a-22c are configured to implement predetermined processes in accordance with the program.

Specifically, the controlling unit 22a receives the signals outputted from the sensing unit 21 and processes those signals. Then, the controlling unit 22a assembles a frame, which contains the processed signals and an ID signal that indicates an identification of the transmitter 2, and sends the frame to the transmitting unit 22b. The process of frame sending is repeatedly performed in accordance with the program at a predetermined cycle.

Moreover, the controlling unit 22a includes a LF inputting component 22aa (i.e., LFIC in FIG. 2A) that is configured to input, when an electromagnetic wave that has a low frequency, for example, of about 125 kHz is received by the command signal inputting unit 22c, a signal that corresponds to the electromagnetic wave from the command signal inputting unit 22c.

When the signal corresponding to the electromagnetic wave is inputted to the controlling unit 22a via the LF inputting component 22aa, the controlling unit 22a determines whether the signal is a command signal that indicates a predefined instruction for the transmitter 2. If it is, the controlling unit 22a performs a predetermined task according to the instruction indicated by the signal. Otherwise, the electromagnetic wave is considered as merely a noise, and the command signal inputting unit 22c immediately enters into a sleep mode so as to suppress the electric power consumption (i.e., the standby current) thereof.

The command signal inputting unit 22c is configured to output the signal to the controlling unit 22a in response to receipt of the electromagnetic wave via the receiving antenna 23. The command signal inputting unit 22c includes a receiver sensitivity switch (i.e., RSW in FIG. 2A) that is configured to change the receiver sensitivity of the command signal inputting unit 22c between a higher and a lower value.

Figure 3:
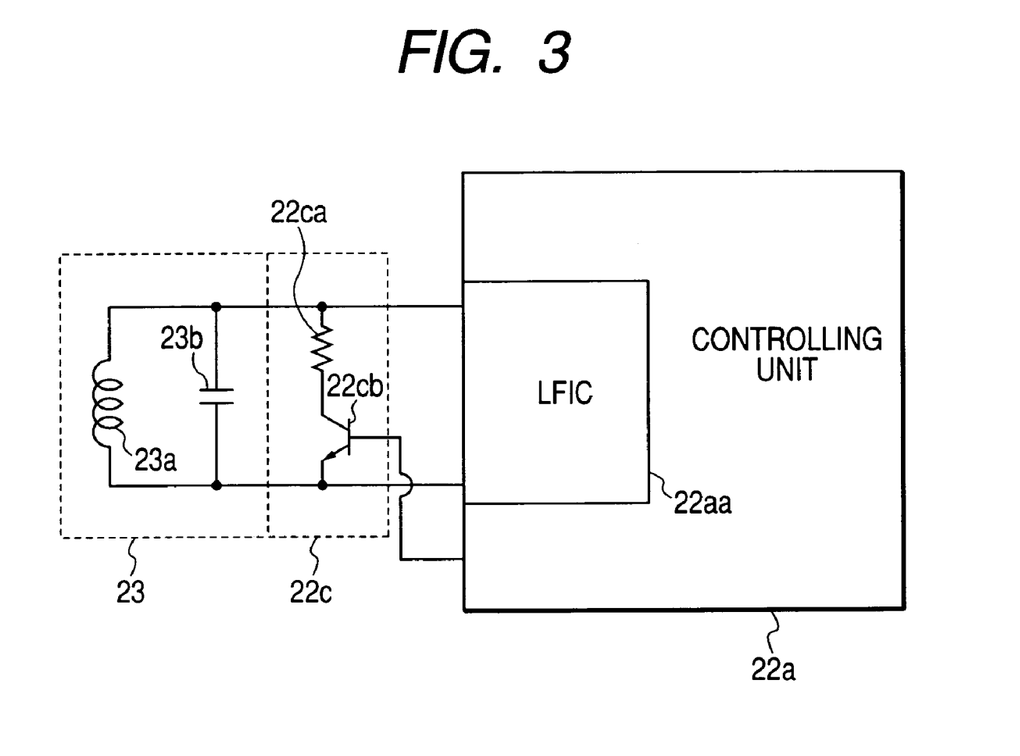
FIG. 3 is a schematic circuit diagram illustrating the overall configuration of a command signal inputting unit and a receiving antenna of the transmitter of FIG. 2A.

FIG. 3 shows an exemplary configuration of the receiving antenna 23 and the command signal inputting unit 22c, which is derived on the assumption that the electromagnetic wave has a low frequency as described above.

As shown in FIG. 3, the receiving antenna 23 is configured with a coil 23a and a capacitor 23b, which are connected in parallel with each other to form an LC circuit. The command signal inputting unit 22c includes a damping resistor 22ca and a transistor 22cb that are connected in series with each other. Further, the serially connected resistor 22ca and the transistor 22cb are together connected in parallel with the receiving antenna 23.

The transistor 22cb, which makes up the receiver sensitivity switch of the command signal inputting unit 22c, is turned on and off in response to receipt of an instruction from the controlling unit 22a. Specifically, when bias current is provided to the base of the transistor 22cb by the controlling unit 22a as an instruction to lower the receiver sensitivity of the command signal inputting unit 22c, the transistor 22cb is turned on so that the damping resistor 22ca is electrically connected in parallel with the LC circuit of the receiving antenna 23, thus setting the receiver sensitivity to the lower value. On the contrary, when no bias current is provided by the controlling unit 22a as an instruction to increase the receiver sensitivity of the command signal inputting unit 22c, the transistor 22cb is turned off so that the damping resistor 22ca is electrically separated from the LC circuit of the receiving antenna 23, thus setting receiver sensitivity to the higher value.

The receiving antenna 23, the command signal inputting unit 22c, and the LF inputting component 22aa of the controlling unit 22a together make up a command signal receiver of the transmitter 2.

Turning to FIG. 2, the transmitting unit 22b is configured to transmit the frame sent from the controlling unit 22a to the receiver 3 via the transmitting antenna 24.

Each of the transmitters 2 with the above-described configuration is mounted to an air valve of a corresponding one of the wheels 5a-5d of the vehicle 1 such that the sensing unit 21 thereof is located inside the tire on the wheel so as to be exposed to the air in the tire.

On the other hand, the receiver 3 is configured to receive the frames transmitted from the transmitters 2 and determine the inflation pressures of the four tires on the wheels 5a-5d based on the signals contained in the respective frames.

Figure 2B:
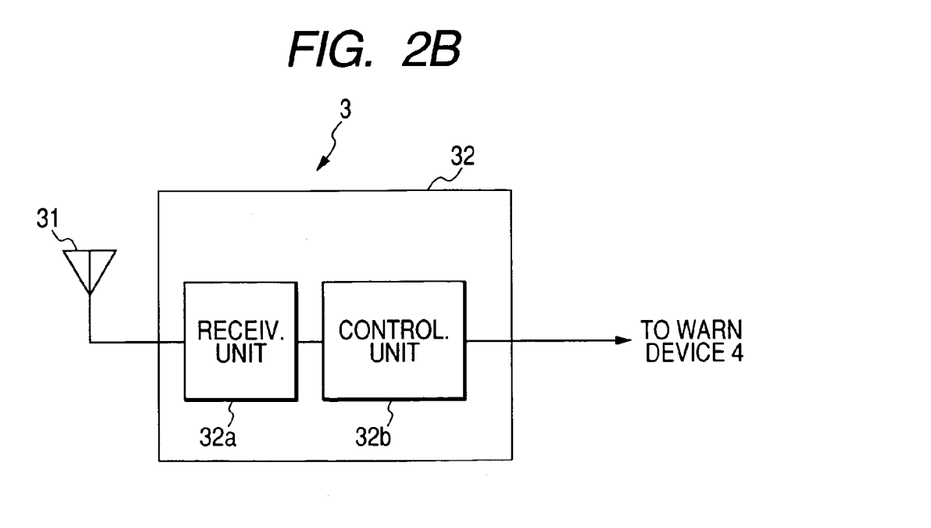
FIG. 2B is a block diagram showing the overall configuration of a receiver of the tire inflation pressure sensing apparatus of FIG. 1.

FIG. 2B shows the overall configuration of the receiver 3. As shown in FIGS. 1 and 2B, the receiver 3 is configured with four antennas 31 and a microcomputer 32.

Each antenna 31 is mounted to the body 6 of the vehicle 1 at a location adjacent to a corresponding one of the four transmitters 2. For example, each antenna 31 may be mounted to a corresponding wheel well such that it is away from the corresponding transmitter 2 by a given distance.

The microcomputer 32 is of a well-known type, which is configured with a CPU, a ROM, a RAM, and I/O devices.

The microcomputer 32 functionally includes a receiving unit 32a and a controlling unit 32b, which are realized by a program installed in the ROM of the microcomputer 32 when the program is activated. The two units 32a and 32b are configured to implement predetermined processes in accordance with the program.

Specifically, the receiving unit 32a receives the frames transmitted from the transmitters 2 via the respective antennas 31 and provides the received frames to the controlling unit 32b.

The controlling unit 32b receives the frames provided by the receiving unit 32a and identifies for each of the frames the corresponding wheel, to which the transmitter 2 having sent out the frame is installed, based on the ID signal contained in the frame. Then, the controlling unit 32b determines the inflation pressure of each of the four tires through performing necessary signal processing and calculations based on the signals contained in the corresponding frame. For example, a temperature compensation process is performed for the inflation pressure of the tire based on a temperature signal contained in the frame which indicates the temperature of air in the tire.

Further, the controlling unit 32b compares the determined inflation pressure of each of the four tires with a predefined threshold Th and outputs a warning signal to the warning device 4 when it is lower than the predefined threshold Th. The warning signal is indicative of the inflation pressure and location of the tire.

The warning device 4 is arranged, as shown in FIG. 1, in a location that is visible for the driver of the vehicle 1. The warning device 4 may be configured with at least one of a warning lamp, a warning display, and a warning buzzer, which are disposed in the instrument panel of the vehicle 1. The warning device 4 informs the driver of the decrease in the inflation pressure of the tire along with the location of the tire within the vehicle 1 upon receiving the warning signal from the controlling unit 32b.

Having described the overall configuration of the tire inflation pressure sensing apparatus S1, operation thereof will be described hereinafter.

In the tire inflation pressure sensing apparatus S1, each of the transmitters 2 has a first and a second operation mode and normally operates in the first operation mode.

In the first operation mode, the controlling unit 22a of the transmitter 2 receives signals outputted from the sensing unit 21, which indicate the inflation pressure of the tire and the temperature of air in the tire, and performs necessary signal processing on those signals. Then, the controlling unit 22a assembles a frame that contains the processed signals and an ID signal indicative of the identification of the transmitter 2. The frame is then provided to the transmitting unit 22b so that it is transmitted from the transmitting unit 22b to the receiver 3.

The above sensing and transmitting process in the transmitter 2 is repeatedly performed at a predetermined cycle, for example, of one minute.

Moreover, in the first operation mode, the receiver sensitivity of the command signal inputting unit 22c of the transmitter 2 is set to the lower value so as to prevent the command signal inputting unit 22c and the controlling unit 22a from being activated by noises.

The receiving unit 32a of the receiver 3 receives the frames transmitted from the transmitters 2 via the respective antennas 31 and provides those frames to the controlling unit 32b. Then, the controlling unit 32b identifies for each of the frames the corresponding wheel and determines the inflation pressure of the corresponding tire based on the signals contained in the frame.

When the determined inflation pressure of any of the tires is lower than the predefined threshold Th, a warning signal is provided to the warning device 4 from the controlling unit 32b so that the decrease in the inflation pressure of the tire and the tire location within the vehicle 1 is informed to the driver.

From the above-described first operation mode, each of the transmitters 2 enters into the second operation mode as follows.

When an electromagnetic wave is received by the transmitter 2 in the first operation mode, the controlling unit 22a of the transmitter 2 determines whether the electromagnetic wave is a command signal or merely a noise. If the electromagnetic wave is a command signal, the transmitter 2 enters, from the first operation mode, into the second operation mode to perform a predetermined task according to the instruction indicated by the command signal. Otherwise, if the electromagnetic wave is merely a noise, the transmitter 2 "ignores" the noise and continuously operates in the first operation mode.

In the present embodiment, it is assumed that command signals are provided to the transmitter 2 only when a routine work is performed for the transmitter 2 in a factory or a dealer's shop. The routine work may include, but not limited to, a failure diagnosis and an identification registration for the transmitter 2.

Figure 4:
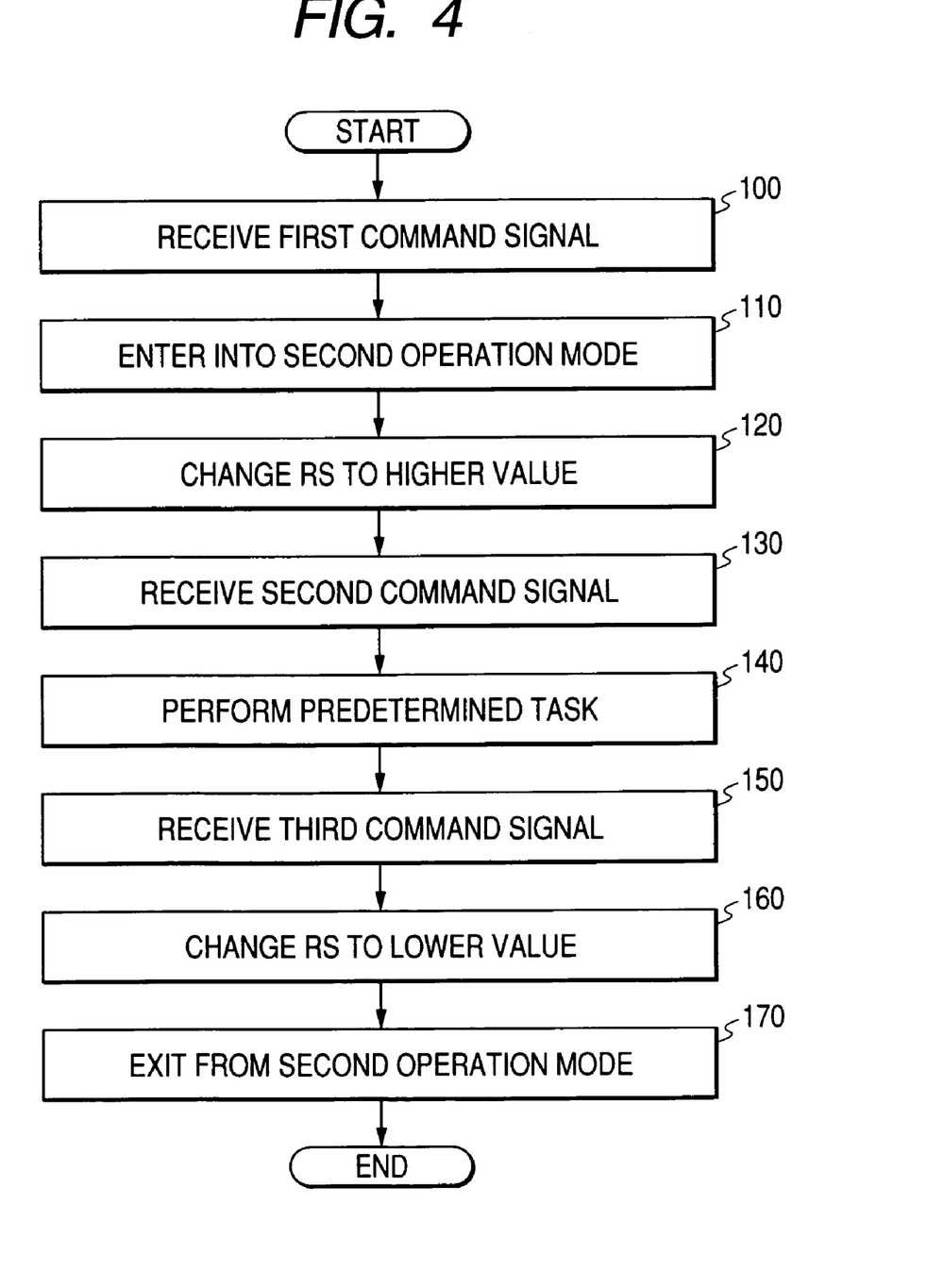
FIG. 4 is a flow chart illustrating an operation of the transmitter of FIG. 2A when a routine work is performed for the transmitter.

FIG. 4 shows an operation of the transmitter 2 when the routine work is performed for the transmitter 2.

As described previously, the transmitter 2 normally operates in the first operation mode in which the receiver sensitivity of the command signal inputting unit 22c is set to the lower value so as to prevent the command signal inputting unit 22c and the controlling unit 22a from being activated by noises.

To perform the routine work for the transmitter 2, a first command signal, which indicates a first instruction for the transmitter 2 to set the receiver sensitivity of the command signal inputting unit 22c to the higher value, is first received by the transmitter 2, as indicated at Step 100.

The first command signal may be applied to the transmitter 2 by a command signal applying device from a location so close to the transmitter 2 that the command signal inputting unit 22c can input the first command signal despite the lower receiver sensitivity thereof.

Then, the transmitter 2 enters from the first operation mode into the second operation mode, as indicated at Step 110, and the controlling unit 22a changes the receiver sensitivity of the command signal inputting unit 22c (i.e., RS in FIG. 4) from the lower value to the higher value, as indicated at Step 120.

After that, a second command signal, which indicates a second instruction for the transmitter 2, is received by the transmitter 2, as indicated at Step 130.

Since the receiver sensitivity of the command signal inputting unit 22c has been changed to the higher value, the second command signal can be applied by the command signal applying device in a wider range than the first command signal, thus improving efficiency of the routine work.

In response to receipt of the second command signal, the controlling unit 22a performs a predetermined task according to the second instruction indicated by the second command signal, as indicated at Step 140.

The predetermined task may include, but not limited to, transmission of a signal that indicates the results of a failure diagnosis for the transmitter 2 via the transmitting unit 22b or transmission of the ID signal via the transmitting unit 22b for making identification registration for the transmitter 2.

After completion of the predetermined task, a third command signal, which indicates a third instruction for the transmitter 2, is received by the transmitter 2, as indicated at Step 150.

Then, according to the third instruction indicated by the third command signal, the controlling unit 22a changes the receiver sensitivity of the command signal inputting unit 22c (i.e., RS in FIG. 4) from the higher value to the lower value, as indicated at Step 160, and the transmitter 2 exits from the second operation mode to return to the first operation mode, as indicated at Step 170.

It is to be appreciated that though only a predetermined task is illustrated in the above-described operation, two or more predetermined tasks may be performed in response to receipt of more than one command signal between Steps 120 and 150.

To sum up, in the tire inflation pressure sensing apparatus S1 according to the present embodiment, the command signal inputting unit 22c of each of the transmitters 2 includes a receiver sensitivity switch that is configured to change the receiver sensitivity of the command signal inputting unit 22c between the higher and lower values.

Each of the transmitters 2 has the first and second operation modes and normally operates in the first operation mode in which the frame that contains signals indicative of the sensing results of the sensing unit 21 is transmitted to the receiver 3 and the receiver sensitivity of the command signal inputting unit 22c is set to the lower value.

Consequently, even when the vehicle 1 is parked in an area where there exist electromagnetic wave noises with high levels, the command signal inputting unit 22c and the controlling unit 22a of each of the transmitters 2 can still be prevented from being activated by those noises, thus suppressing the electric power consumption (i.e., the standby current) of each of the transmitters 2.

Moreover, when a routine work is to be performed for any of the transmitters 2 in a factory or a dealer's shop, the first command signal is applied to the transmitter 2 so that the transmitter 2 enters into the second operation mode and the receiver sensitivity of the command signal inputting unit 22c is set to the higher value.

Consequently, succeeding command signals, including the second and third command signals, can be reliably applied by a command signal applying device to the transmitter 2 from a location that is sufficiently away from the transmitter 2, thus improving efficiency of the routine work.

As a result, it becomes possible to prevent the transmitters 2 of the tire inflation pressure sensing apparatus S1 from being activated by fake command signals (i.e., noises) while ensuring easy and reliable activation of the transmitters 2 by true command signals.

Second Embodiment

In this embodiment, a tire inflation pressure sensing apparatus S2 is provided which has the same configuration as the tire inflation pressure sensing apparatus S1 according to the previous embodiment.

However, operation of the tire inflation pressure sensing apparatus S2 is different from that of the tire inflation pressure sensing apparatus S1. Accordingly, only the difference in operation between the tire inflation pressure sensing apparatus S1 and S2 is to be described hereafter.

In the present embodiment, it is assumed, as in the previous embodiment, that command signals are provided to the transmitters 2 only when a routine work is performed for the transmitters 2 in a factory or a dealer's shop. The routine work may include, but not limited to, a failure diagnosis and an identification registration for the transmitters 2.

When the routine work is performed, the transmitters 2 are generally subject to a pressure that falls out of the normal range of pressure sensed by the transmitters 2 in normal service condition (i.e., in the first operation mode).

For example, when the transmitters 2 are detached from the vehicle wheels 5a-5d for making a failure diagnosis therefore, they are subject to the atmospheric pressure that is below the normal range.

Moreover, to enable the receiver 3 to identify different frames transmitted from different transmitters 2, it is required to register in advance the identifications of the transmitters 2 in the RAM of the microcomputer 32 of the receiver 3 when the transmitters 2 are installed to the respective vehicle wheels 5a-5d in the factory or dealer's shop.

During such identification registration, the transmitters 2 are each subject to a tire inflation pressure that is set to be above the normal range in consideration of the tire inflation pressure decrease that occurs during the delivery of the vehicle 1 from the factory or dealer's shop to an end user.

In view of the above, in the present embodiment, the receiver sensitivity of the command signal inputting unit 22c of each of the transmitters 2 is set based on the inflation pressure of the corresponding tire.

Figure 5:
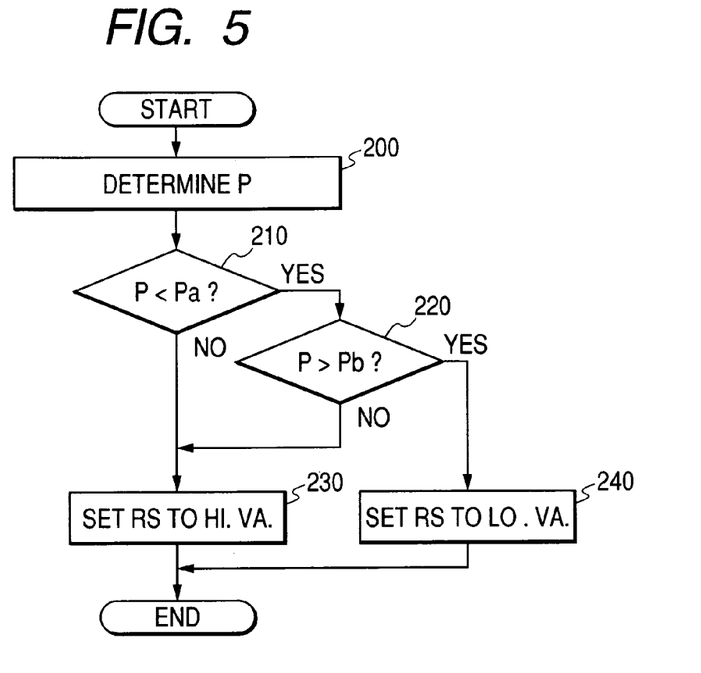
FIG. 5 is a flow chart illustrating an operation of a controlling unit of a transmitter in a tire inflation pressure sensing apparatus according to the second embodiment of the present invention for setting the receiver sensitivity of a command signal inputting unit of the transmitter.

FIG. 5 shows an operation of the controlling unit 22a of each of the transmitters 2 for setting the receiver sensitivity of the command signal inputting unit 22c.

At Step 200, the controlling unit 22a determines the inflation pressure of the tire (i.e., P in FIG. 5) based on the signals outputted from the sensing unit 21. The determination process may be conducted in the same way as that conducted in the receiver 3. Otherwise, the inflation pressure of the tire may be determined based only on the pressure signal outputted from the pressure sensor of the sensing unit 21.

At Step 210, the controlling unit 22a determines whether the inflation pressure of the tire (i.e., P in FIG. 5) is lower than a first reference value Pa. The first reference value Pa here may be the upper limit of the normal range.

At Step 220, the controlling unit 22a further determines whether the inflation pressure of the tire (i.e., P in FIG. 5) is higher than a second reference value Pb. The second reference value Pb here may be the lower limit of the normal range.

If either of the determinations at Steps 210 and 220 yields a "NO" answer, in other words, if the routine wok is performed for the transmitter 2, the controlling unit 22a sets the receiver sensitivity of the command signal inputting unit 22c (i.e., RS in FIG. 5) to the higher value at Step 230.

Otherwise, if both the determinations at Steps 210 and 220 yield "YES" answers, in other words, if the transmitter 2 is in normal service condition, the controlling unit 22a sets the receiver sensitivity of the command signal inputting unit 22c (i.e., RS in FIG. 5) to the lower value at Step 240.

With the above operation, when each of the transmitters 2 operates in the first operation mode to transmit the frame to the receiver 3, the receiver sensitivity of the command signal inputting unit 22c is set to the lower value so that the command signal inputting unit 22c and the controlling unit 22a are prevented from being activated by noises, thus suppressing the electric power consumption (i.e., the stand by current) of the transmitter 2.

On the contrary, when the routine work is performed for any of the transmitters 2, the receiver sensitivity of the command signal inputting unit 22c of the transmitter 2 is set to the higher value. In other words, the transmitter 2 receives any command signal for performing the routine work only when the receiver sensitivity of the command signal inputting unit 22c has the higher value.

Accordingly, the command signal can be reliably applied by a command signal applying device to the transmitter 2 from a location that is sufficiently away from the transmitter 2, thus improving efficiency of the routine work.

In response to receipt of the command signal, the transmitter 2 enters into the second operation mode to perform a predetermined task according to an instruction indicated by the command signal.

In addition, the transmitter 2 may be configured to immediately exit from the second operation mode to return to the first operation mode after completion of the predetermined task. Otherwise, the transmitter 2 may also be configured to continuously operate in the second operation mode for a predetermined time period from completion of the predetermined task to receive a succeeding command signal.

To sum up, in the tire inflation pressure sensing apparatus S2 according to the present embodiment, the receiver sensitivity of the command signal inputting unit 22c of each of the transmitters 2 is set to one of the higher and lower values based on the inflation pressure of the corresponding tire.

Moreover, each of the transmitters 2 receives command signals only when the receiver sensitivity of the command signal inputting unit 22c of the transmitter 2 is set to the higher value.

Consequently, it becomes possible to prevent the transmitters 2 from being activated by noises while ensuring easy and reliable activation of the transmitters 2 by command signals.

Third Embodiment

In this embodiment, a tire inflation pressure sensing apparatus S3 is provided which has almost the same configuration and operation as the tire inflation pressure sensing apparatus S2 according to the second embodiment.

Accordingly, only the difference between the tire inflation pressure sensing apparatuses S2 and S3 is to be described hereafter.

As described previously, in the second embodiment, the controlling unit 22a of each of the transmitters 2 sets the receiver sensitivity of the command signal inputting unit 22c to the higher value if the inflation pressure of the corresponding tire is not lower than the first reference value Pa, so as to improve efficiency of the routine work.

However, the inflation pressure of the tire may exceed the first reference value Pa when no routine work is performed for the transmitter 2.

Specifically, when the vehicle 1 is running, the temperature of air in the tire increases with the running speed of the vehicle 1, thus increasing the inflation pressure of the tire. Consequently, in some cases, the inflation pressure of the tire may exceed the first reference value Pa, thus causing the receiver sensitivity of the command signal inputting unit 22c to be set to the higher value.

Figure 6:
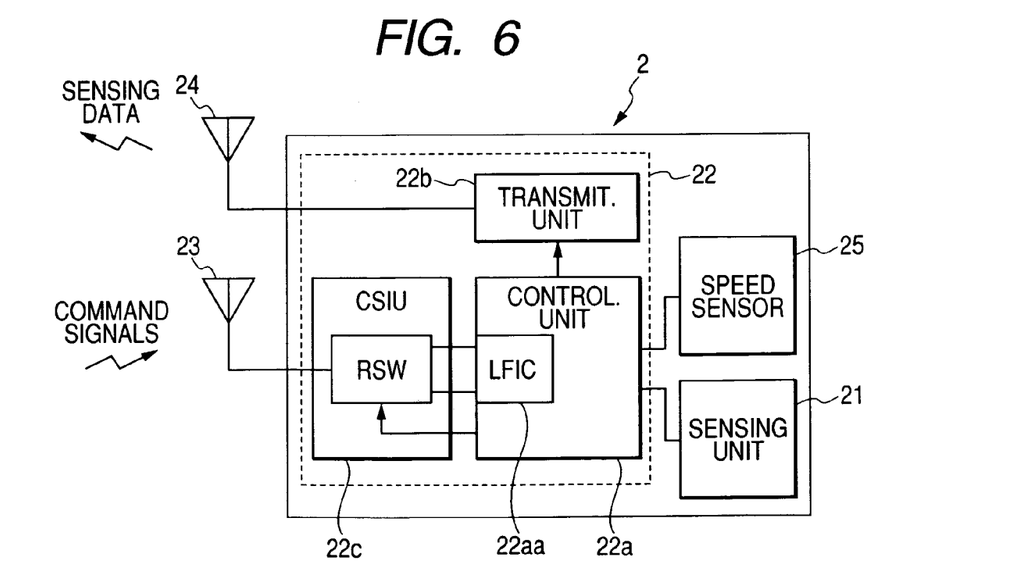
FIG. 6 is a block diagram showing the overall configuration of a transmitter of a tire inflation pressure sensing apparatus according to the third embodiment of the present invention.

To solve such a problem, in the present embodiment, each of the transmitters 2 is configured to further include a speed sensor 25, as shown in FIG. 6.

The speed sensor 25 is employed to detect the running speed of the vehicle 1. The speed sensor 25 is configured, for example, with a capacitive acceleration sensor that outputs a signal corresponding to a centrifugal force created due to rotation of the vehicle wheel.

Accordingly, the controlling unit 22a is configured to further determine the running speed of the vehicle 1 based on the signal outputted from the speed sensor 25.

Figure 7:
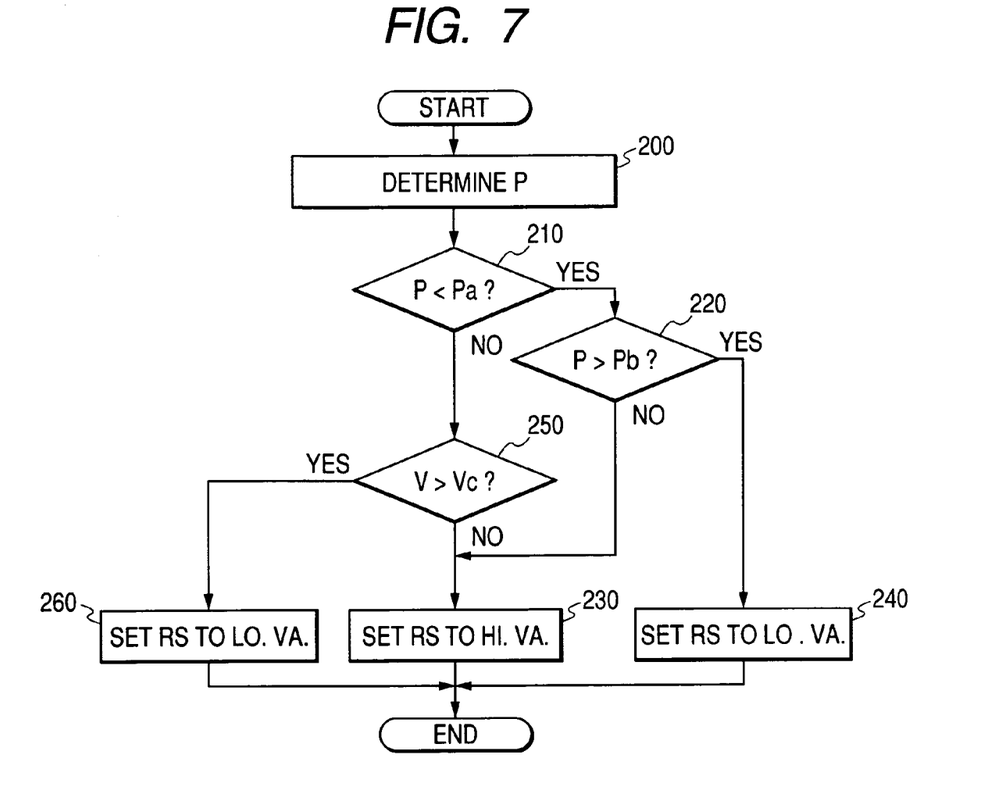
FIG. 7 is a flow chart illustrating an operation of a controlling unit of the transmitter of FIG. 6 for setting the receiver sensitivity of a command signal inputting unit of the transmitter.

FIG. 7 shows an operation of the controlling unit 22a of each of the transmitters 2 in the tire inflation pressure sensing apparatus S3 for setting the receiver sensitivity of the command signal inputting unit 22c.

As shown in FIG. 7, in addition to Steps 200-240 described previously, two more Steps 250 and 260 are included in the operation of the controlling unit 22a.

Specifically, when the inflation pressure of the tire (i.e., P in FIG. 7) is not lower than the first reference value Pa, the controlling unit 22a further determines at Step 250 whether the running speed of the vehicle 1 (i.e., V in FIG. 7) is higher than a predetermined value Vc.

If the determination yields a "NO" answer, the controlling unit 22a sets the receiver sensitivity of the command signal inputting unit 22c (i.e., RS in FIG. 7) to the higher value at Step 230.

Otherwise, If the determination yields a "YES" answer, the controlling unit 22a sets the receiver sensitivity of the command signal inputting unit 22c (i.e., RS in FIG. 7) to the lower value at Step 260.

With the above operation, when the inflation pressure of the tire exceeds the first reference value Pa during running of the vehicle 1, the controlling unit 22a is still able to set the receiver sensitivity of the command signal inputting unit 22c to the lower value, thus preventing the command signal inputting unit 22c and the controlling unit 22a from being activated by noises.

To sum up, in the tire inflation pressure sensing apparatus S3 according to the present embodiment, the receiver sensitivity of the command signal inputting unit 22c of each of the transmitters 2 is set to one of the higher and lower values based not only on the inflation pressure of the corresponding tire but also on the running speed of the vehicle 1, thus ensuring correct setting of the receiver sensitivity.

Fourth Embodiment

In this embodiment, a tire inflation pressure sensing apparatus S4 is provided which has the same configuration as the tire inflation pressure sensing apparatus S3 according to the third embodiment.

However, operation of the tire inflation pressure sensing apparatus S4 is different from that of the tire inflation pressure sensing apparatus S3. Accordingly, only the difference in operation between the tire inflation pressure sensing apparatuses S3 and S4 is to be described hereafter.

In the previous embodiments, it is assumed that command signals are provided to the transmitters 2 only when a routine work is performed for the transmitters 2 in a factory or a dealer's shop.

However, in the present embodiment, it is assumed that command signals are provided by the receiver 3 to the transmitters 2 when the vehicle 1 is running, so as to cause the transmitters 2 to transmit the frames to the receiver 3.

Specifically, as in the previous embodiments, each of the transmitters 2 of the tire inflation pressure sensing apparatus S4 is configured to repeatedly transmit, in the first operation mode, the frame to the receiver 3 at a predetermined cycle.

However, the probability that the receiver 3 reliably (or accurately) receives the frames transmitted from the respective transmitters 2 decreases as the running speed of the vehicle 1 increases.

To ensure reliable transmission of the frames from the transmitters 2 to the receiver 3, in the present embodiment, the receiver 3 is configured to further transmit command signals, each of which indicates an instruction for one of the transmitters 2 to transmit the frame.

Specifically, when the running speed of the vehicle 1 is not lower than a predetermined value Vc and thus the receiver 3 has not received an "expected" one of the frames transmitted from a corresponding one of the transmitters 2 for a predetermined time period, it transmits to the transmitter 2 a command signal that indicates an instruction for the transmitter 2 to transmit the frame to the receiver 3 once more.

Upon receipt of the command signal, the transmitter 2 enters from the first operation mode to the second operation mode to perform a predetermined task (i.e., transmitting the frame once more in this case) according to the instruction indicated by the command signal.

In order for the transmitters 2 to reliably receive command signals transmitted from the receiver 3, in the present embodiment, the receiver sensitivity of the command signal inputting unit 22c of each of transmitters 2 is set to the higher value when the running speed of the vehicle 1 is not lower than the predetermined value Vd.

Figure 8:
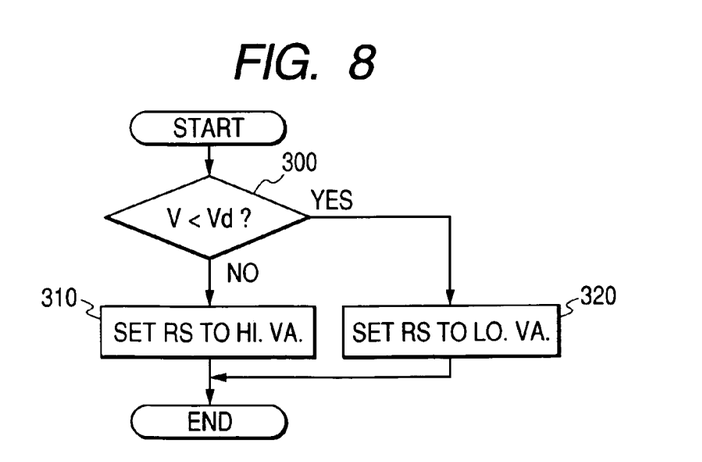
FIG. 8 is a flow chart illustrating an operation of a controlling unit of a transmitter in a tire inflation pressure sensing apparatus according to the fourth embodiment of the present invention for setting the receiver sensitivity of a command signal inputting unit of the transmitter.

FIG. 8 shows an operation of the controlling unit 22a of each of the transmitters 2 for setting the receiver sensitivity of the command signal inputting unit 22c.

At Step 300, the controlling unit 22a determines whether the running speed of the vehicle 1 (i.e., V in FIG. 8) is lower than the predetermined value Vd.

If the determination yields a "NO" answer, the controlling unit 22a sets the receiver sensitivity of the command signal inputting unit 22c (i.e., RS in FIG. 8) to the higher value at Step 310.

Otherwise, if the determination yields a "YES" answer, the controlling unit 22a sets the receiver sensitivity of the command signal inputting unit 22c (i.e., RS in FIG. 8) to the lower value at Step 320.

With the above operation, when the receiver 3 has not received an "expected" one of the frames transmitted from the corresponding transmitter 2 for the predetermined time period due to the running speed of the vehicle 1 being not lower than the predetermined value Vd, it can reliably cause the transmitter 2 to transmit the frame once more through transmitting a command signal to the transmitter 2.

Further, the problem of unwanted activation of the transmitters 2 by noises may occur when the vehicle 1 is parked for a long time in an area where there exist noises with high levels. However, the problem will not occur when the vehicle 1 passes through such an area with the running speed being not lower than the predetermined value Vd.

Furthermore, even when the vehicle 1 is parked for a long time in such an area, each of the transmitters 2 can still be prevented from being activated by the noises, because the receiver sensitivity of the command signal inputting unit 22c is set to the lower value due to the running speed of the vehicle 1 being lower than the predetermined value Vd.

To sum up, in the tire inflation pressure sensing apparatus S4 according to the present embodiment, the receiver sensitivity of the command signal inputting unit 22c of each of the transmitters 2 is set to one of the higher and lower values based on the running speed of the vehicle 1.

Moreover, each of the transmitters 2 receives any command signal transmitted from the receiver 3 only when the receiver sensitivity of the command signal inputting unit 22c of the transmitter 2 is set to the higher value.

Consequently, it becomes possible to prevent the transmitters 2 from being activated by noises while ensuring reliable activation of the transmitters 2 by the receiver 3 via command signals.

Other Embodiments

While the above particular embodiments of the invention have been shown and described, it will be understood by those who practice the invention and those skilled in the art that various modifications, changes, and improvements may be made to the invention without departing from the spirit of the disclosed concept.

For example, in the previous embodiments of the invention, the receiver 3 is configured to include one antenna 31 for each of the transmitters 2, via which the receiver 3 receives the frame transmitted from the transmitter 2.

However, the receiver 3 may also be configured to include only a single antenna 31, via which the receiver 3 receives all the frames transmitted from the respective transmitters 2.

Moreover, in the first embodiment of the invention, each of the transmitters 2 is configured to receive the third command signal after completion of the predetermined task so as to set the receiver sensitivity of the command signal inputting unit 22c to the lower value and return to the first operation mode according to the third instruction indicated by the third command signal.

However, each of the transmitters 2 may also be configured to set the receiver sensitivity of the command signal inputting unit 22c to the lower value and return to the first operation mode by itself after a predetermined time from completion of the predetermined task, without receiving the third command signal.

Furthermore, in the fourth embodiment of the invention, each of the transmitters 2 is configured to have the first operation mode, in which it repeatedly transmits the frame at a predetermined cycle, and the second operation mode in which it transmits the frame in response to receipt of a command signal transmitted from the receiver 3.

However, each of the transmitters 2 may also be configured to operate only in the second operation mode, so that it transmits the frame only in response to receipt of a command signal transmitted from the receiver 3.

Such modifications, changes, and improvements within the skill of the art are intended to be covered by the appended claims.

What is claimed is:

1. A tire inflation pressure sensing apparatus comprising:
a transmitter provided on a wheel of a vehicle, said transmitter including a pressure sensor configured to sense an inflation pressure of a tire mounted on the wheel and generate a pressure signal that indicates the sensed inflation pressure of the tire, said transmitter having a first operation mode, in which said transmitter transmits the pressure signal generated by said pressure sensor, and a second operation mode;
a receiver provided on a body of the vehicle, said receiver working to receive the pressure signal transmitted from said transmitter and determine the inflation pressure of the tire based on the pressure signal; and
a command signal receiver operatively connected to said transmitter, said command signal receiver working to sequentially receive a first and a second command signal that respectively indicate a first and a second instruction for said transmitter, said command signal receiver having a variable receiver sensitivity that is set by said transmitter to one of a higher value and a lower value,
wherein, in response to receipt of the first command signal by said command signal receiver, said transmitter enters into the second operation mode and sets the receiver sensitivity of said command signal receiver to the higher value according to the first instruction indicated by the first command signal, and
after setting of the receiver sensitively of said command signal receiver to the higher value, said command signal receiver receives the second command signal so that said transmitter performs a predetermined task according to the second instruction indicated by said second command signal.

2. The tire inflation pressure sensing apparatus as set forth in claim 1, wherein said command signal receiver includes an antenna, via which the command signals are received by said command signal receiver, and a switch that is configured to be selectively turned on and off by said transmitter so as to change the receiver sensitivity of said command signal receiver between the higher and lower values.

3. The tire inflation pressure sensing apparatus as set forth in claim 1, wherein, after completion of the predetermined task by said transmitter, said command signal receiver receives a third command signal so that said transmitter sets the receiver sensitively of said command signal receiver to the lower value and exits from the second operation mode according to a third instruction indicated by the third command signal.

4. The tire inflation pressure sensing apparatus as set forth in claim 1, wherein, after a predetermined time from completion of the predetermined task, said transmitter sets the receiver sensitively of said command signal receiver to the lower value and exits from the second operation mode.

5. The tire inflation pressure sensing apparatus as set forth in claim 1, wherein the predetermined task performed by said transmitter in the second operation mode is to transmit a signal for making a failure diagnosis for said transmitter and said command signal receiver.

6. The tire inflation pressure sensing apparatus as set forth in claim 1, wherein the predetermined task performed by said transmitter in the second operation mode is to transmit an identification signal that indicates an identification of said transmitter so as to make an identification registration for said transmitter.

7. The tire inflation pressure sensing apparatus as set forth in claim 1, wherein said command signal receiver is integrated into said transmitter.

8. A tire inflation pressure sensing apparatus comprising:
a transmitter provided on a wheel of a vehicle, said transmitter including a pressure sensor configured to sense an inflation pressure of a tire mounted on the wheel and generate a pressure signal that indicates the sensed inflation pressure of the tire, said transmitter having a first operation mode, in which said transmitter transmits the pressure signal generated by said pressure sensor, and a second operation mode;
a receiver provided on a body of the vehicle, said receiver working to receive the pressure signal transmitted from said transmitter and determine the inflation pressure of the tire based on the pressure signal; and
a command signal receiver operatively connected to said transmitter, said command signal receiver working to receive a command signal that indicates an instruction for said transmitter, said command signal receiver having a variable receiver sensitivity, wherein, the receiver sensitivity of said command signal receiver is set to one of a higher value and a lower value by said transmitter based on the inflation pressure of the tire sensed by said pressure sensor, the command signal is received by said command signal receiver when the receiver sensitivity of said command signal receiver has the higher value, and in response to receipt of the command signal by said command signal receiver, said transmitter enters into the second operation mode to perform a predetermined task according to the instruction indicated by the command signal.

9. The tire inflation pressure sensing apparatus as set forth in claim 8, wherein said command signal receiver includes an antenna, via which the command signal is received by said command signal receiver, and a switch that is configured to be selectively turned on and off by said transmitter so as to change the receiver sensitivity of said command signal receiver between the higher and lower values.

10. The tire inflation pressure sensing apparatus as set forth in claim 8, wherein said transmitter sets the receiver sensitivity of said command signal receiver to the lower value when the inflation pressure of the tire is lower than a first reference value and higher than a second reference value and to the higher value otherwise.

11. The tire inflation pressure sensing apparatus as set forth in claim 10 further comprising a speed sensor that works to sense a speed of the vehicle and is operatively connected to said transmitter, wherein when the inflation pressure of the tire is not lower than the first reference value, said transmitter sets the receiver sensitivity of said command signal receiver to the higher value if the speed of the vehicle sensed by said speed sensor is lower than a predetermined value and to the lower value otherwise.

12. The tire inflation pressure sensing apparatus as set forth in claim 8, wherein the predetermined task performed by said transmitter in the second operation mode is to transmit a signal for making a failure diagnosis for said transmitter and said command signal receiver.

13. The tire inflation pressure sensing apparatus as set forth in claim 8, wherein the predetermined task performed by said transmitter in the second operation mode is to transmit an identification signal that indicates an identification of said transmitter so as to make an identification registration for said transmitter.

14. The tire inflation pressure sensing apparatus as set forth in claim 8, wherein said command signal receiver is integrated into said transmitter.

15. A tire inflation pressure sensing apparatus comprising:

a transmitter provided on a wheel of a vehicle, said transmitter including a pressure sensor configured to sense an inflation pressure of a tire mounted on the wheel and generate a pressure signal that indicates the sensed inflation pressure of the tire, said transmitter having a first operation mode, in which said transmitter transmits the pressure signal generated by said pressure sensor, and a second operation mode;

a receiver provided on a body of the vehicle, said receiver working to receive the pressure signal transmitted from said transmitter and determine the inflation pressure of the tire based on the pressure signal;

a speed sensor operatively connected to said transmitter, said speed sensor working to sense a speed of the vehicle; and a command signal receiver operatively connected to said transmitter, said command signal receiver working to receive a command signal that indicates an instruction for said transmitter, said command signal receiver having a variable receiver sensitivity, wherein, the receiver sensitivity of said command signal receiver is set to one of a higher value and a lower value by said transmitter based on the speed of the vehicle sensed by said speed sensor, the command signal is received by said command signal receiver when the receiver sensitivity of said command signal receiver has the higher value, and in response to receipt of the command signal by said command signal receiver, said transmitter enters into the second operation mode to perform a predetermined task according to the instruction indicated by the command signal.

16. The tire inflation pressure sensing apparatus as set forth in claim 15, wherein said command signal receiver includes an antenna, via which the command signal is received by said command signal receiver, and a switch that is configured to be selectively turned on and off by said transmitter so as to change the receiver sensitivity of said command signal receiver between the higher and lower values.

17. The tire inflation pressure sensing apparatus as set forth in claim 15, wherein said transmitter sets the receiver sensitivity of said command signal receiver to the lower value when the speed of the vehicle is lower than a predetermined value and to the higher value otherwise.

18. The tire inflation pressure sensing apparatus as set forth in claim 15, wherein the predetermined task performed by said transmitter in the second operation mode is to transmit the pressure signal so as to ensure reliable transmission of the pressure signal from said transmitter to said receiver.

19. The tire inflation pressure sensing apparatus as set forth in claim 15, wherein the predetermined task performed by said transmitter in the second operation mode is to transmit an identification signal that indicates an identification of said transmitter so as to allow said receiver to identify said transmitter.

20. The tire inflation pressure sensing apparatus as set forth in claim 15, wherein said speed sensor and said command signal receiver are integrated into said transmitter.

* * * * *